US008547848B2

(12) United States Patent
Nikander et al.

(10) Patent No.: US 8,547,848 B2
(45) Date of Patent: Oct. 1, 2013

(54) TRAFFIC CONTROL WITHIN A NETWORK ARCHITECTURE PROVIDING MANY-TO-ONE TRANSMISSION WITH DENIAL-OF-SERVICE PROTECTION (75) Inventors: Pekka Nikander, Jarvas (FI); Mikko Sarela, Kauniainen (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 283 days.

(21) Appl. No.: 13/003,040

(22) PCT Filed: Jul. 9, 2008

(86) PCT No.: PCT/EP2008/058951
§ 371 (c)(1),
(2), (4) Date: Jan. 7, 2011

(87) PCT Pub. No.: WO2010/003459
PCT Pub. Date: Jan. 14, 2010

(65) Prior Publication Data
US 2011/0116381 A1 May 19, 2011

(51) Int. Cl.
H04L 12/26 (2006.01)
H04L 9/00 (2006.01)
H04L 9/32 (2006.01)
H04M 1/66 (2006.01)

(52) U.S. Cl.
USPC ............. 370/236; 380/279; 455/411; 726/9

(58) Field of Classification Search
None
See application file for complete search history.

(56) References Cited

U.S. PATENT DOCUMENTS

| 2003/0172159 | A1 | 9/2003 | Schuba et al. |
| 2005/0050364 | A1 | 3/2005 | Feng |
| 2006/0111080 | A1* | 5/2006 | Bajar et al. ............... 455/411 |
| 2007/0086591 | A1* | 4/2007 | Blom et al. .............. 380/279 |
| 2007/0157300 | A1* | 7/2007 | Sivaradjane et al. ......... 726/9 |

FOREIGN PATENT DOCUMENTS

EP 1580945 A2 9/2005

OTHER PUBLICATIONS

Aura, T. et al. "DOS-Resistant Authentication with Client Puzzles." 8th International Workshop on Security Protocols, Springer-Verlag, London, UK, pp. 178-181, Jan. 1, 2000.
Calvert, K. L. et al. "Concast: Design and Implementation of a New Network Service." 7th International Conference on Network Protocols (ICNP '99), pp. 335-344, Oct. 31-Nov. 3, 1999.
Deering, S. E. et al. "Multicast Routing in Datagram Internetworks and Extended LANs." ACM Transactions on Computer Systems, New York, US, No. 2, May 1, 1990.

* cited by examiner

Primary Examiner — Andrew Chriss
Assistant Examiner — Ajit Reddy
(74) Attorney, Agent, or Firm — Coats & Bennett, P.L.L.C.

(57) ABSTRACT

A method of controlling traffic flow through a service node located within a packet network, which traffic flow originates at a plurality of sending nodes and is destined for a receiving node. The service node is one of a multiplicity of service nodes configured in a tree or other acyclic structure, e.g. of an overlay network. The method comprises receiving a challenge from said receiving node or a downstream service node, generating and caching a further challenge, and combining that further challenge with the received challenges to generate a modified challenge. The modified challenge is then sent to a sending node or to an upstream service node. Subsequently, a request is received, destined for said receiving node and originating at a sending node. A solution accompanying said request is validated using the cached further challenge, and the request forwarded towards said receiving node only if the solution is valid. Otherwise, the request is dropped.

20 Claims, 5 Drawing Sheets

TRAFFIC CONTROL WITHIN A NETWORK ARCHITECTURE PROVIDING MANY-TO-ONE TRANSMISSION WITH DENIAL-OF-SERVICE PROTECTION

TECHNICAL FIELD

The present invention relates to traffic control in a packet data network and more particularly to traffic control within a network architecture providing for many-to-one transmissions.

BACKGROUND

Situations can arise in a packet data network in which many senders require to send data to a single receiver. In the absence of an appropriate control mechanism, this can lead to both network and receiver overload. "Concast" is an example of a network layer service designed to address this issue, and is described in Calvert et al. "Concast: design and implementation of a new network service", ICNP'99 (1999) pp. 335-344, and Calvert et al. "Concast: Design and Implementation of an Active Network Service", Selected Areas in Communications (2001) vol. 19 (3) pp. 426-437. Concast and similar network layer services are characterised by the property of providing many-to-one communication where the receiver receives less traffic than the senders jointly send. In most implementations, this is achieved by actively merging messages at the tree joining points of the Concast network, where selected routers of the underlying IP network implement the Concast protocol. In a typical implementation, a Concast-enabled router recognises a Concast packet by inspecting the IP packet header for the presence of a Router Alert or Hop-by-Hop IP option.

An objective of the original Concast design was to reduce the risk of successful denial-of-service (DoS) attacks against receivers: where there are many senders and only one receiver, the senders can exhaust the receiver's resources unless the receiver has as much resources as all the senders put together. Concast seeks to reduce the amount of resources that the receiver requires by distributing some of the processing of the packets that would otherwise need to be performed by the receiver, to the intermediary nodes in the Concast network.

Typically, a Concast service is described in terms of a common receiver R, and a group G of senders S. The senders are structured in a tree with a number of internal tree nodes, each of which receives traffic from a number of senders and/or other tree nodes, and forwards it towards the receiver, either directly or via further tree nodes. In a typical Concast service, each tree node merges the traffic that it receives according to a merge specification (MS). Typically, the merge specification is supplied by the receiver and distributed through the tree as considered for example in U.S. Pat. No. 6,920,493. Typically the merge specification is distributed in the form of a binary-executable programme.

Concast may be advantageously used for example to relay acknowledgements from multiple clients receiving a multicast service from a server. In this case, each node of the Concast network merges acknowledgement messages together according to the MS, and forwards the merged messages on towards the multicast server.

While the presently proposed Concast services protect the receiver from DoS attacks by merging traffic within the network, they achieve this at the cost of opening some new DoS threats at the tree nodes (e.g. the possibility that a number of senders can be arranged to cause a network node to spend a considerable amount of resources in anticipation of further packets from the senders before completing a packet merge) and preventing senders from directly sending unmodified messages to the receiver. Furthermore, while the present Concast merge specifications are very flexible, they are also costly to implement as they require active hardware in the tree nodes, i.e. to allow the reprogramming of the tree nodes on demand, must be sufficiently generic so that they can execute for example Java byte code (see e.g. Calvert et al 2001, pages 5 and 7). In particular, a typical Concast service requires that the intermediary nodes decapsulate packets en route, merge packets arriving from different sources, and send packets containing information obtained through computation, as specified in the MS.

SUMMARY

It is an object of the present invention to provide a many-to-one type network service which is protected against certain types of DoS attacks and other overload situations by distributing challenges through a tree from a receiver to senders, where the challenges must be solved by the senders in order to allow them to send packets to receiver(s).

According to a first aspect of the present invention there is provided a method of controlling traffic flow through a service node located within a packet network, which traffic flow originates at a plurality of sending nodes and is destined for a receiving node. The service node is one of a multiplicity of service nodes configured in a tree or other acyclic structure, e.g. of an overlay network. The method comprises receiving a challenge from said receiving node or a downstream service node, generating and caching a further challenge, and combining that further challenge with the received challenges to generate a modified challenge. The modified challenge is then sent to a sending node or to an upstream service node. Subsequently, a request is received, destined for said receiving node and originating at a sending node. A solution accompanying said request is validated using the cached further challenge, and the request forwarded towards said receiving node only if the solution is valid. Otherwise, the request is dropped.

Said challenge may comprise an operand, with said step of combining a further challenge with a received challenge comprising applying a pre-defined function to the challenges. Typically, said further challenge is a randomly generated number, and said predefined function is a one-way function, e.g. a hash function.

New challenges may be periodically generated and distributed through the tree structure. Upon receipt of a new challenge at a service node, any currently cached modified challenge for the same receiving node is discarded and/or invalidated.

The step of validating a solution may comprise verifying that an operand accompanying said request is derivable from the cached further challenge. For example, this may involve iteratively applying a hash function H to the cached further challenge $N_{k-1}$ according to:

$$H(H(\ldots H(N_{k-1},N_k)\ldots),N_{k+n-1}),N_{k+n})$$

where the challenges $N_{k>=1}$ are included with said request. In order to avoid duplication of effort, the iterative process may be terminated, and said operand verified if a challenge N in the challenge sequence is reached that has previously been cached.

In order to allow a next hop, downstream node to verify the solution, said cached further challenge is included with said request if the request is to be forwarded.

Said step of validating a solution may comprise applying a hash function to a set of data components included with said request and including a time value and verifying that the result satisfies a criterion dependent upon said time value. If the time value has expired, the request is dropped.

In certain embodiments, said service node may receive a plurality of challenges from respective downstream service nodes, said modified challenge being generated by combining said further challenge with the received challenges.

According to a second aspect of the present invention there is provided a method of controlling the volume of traffic within a packet network and being sent from a plurality of sending nodes to a receiving node. The packet network comprises a multiplicity of service nodes configured in a tree or other acyclic structure between the sending nodes and the receiving nodes. The method comprises a) generating a challenge at said receiving node;
b) sending said challenge from said receiving node to the or each adjacent service node in said tree structure;
c) at each said adjacent service node, generating a further challenge, combining that further challenge with the received challenge to generate a modified challenge, and sending the modified challenge to each next adjacent service node towards said sending nodes;
d) repeating step c) at each layer of the tree structure until all nodes have generated a modified challenge;
e) for each sending node wishing to send packets to said receiving node, providing that sending node with the modified challenge generated by an adjacent service node;
f) using the received modified challenge at said sending node to generate a solution;
g) sending a request including said solution, from said sending node towards said receiving node through said tree structure; and
h) validating said solution at the or at least one service node that receives said request, and forwarding the request only if the solution is valid, otherwise dropping the request.

In an example embodiment, each said service node may be implemented at a corresponding router of the packet network. The packet network may be one of a publish/subscribe network and an IP network.

The challenge generated at said receiving node and each of said further challenges may be a random number, and said step of generating a modified challenge may comprise applying a one-way function, e.g. a hash function, to said received challenge and the further challenge.

The step of using the received modified challenge at said sending node to generate a solution may comprising identifying a solution value that, when hashed with the received modified challenge and, optionally one or more further components, produces a result satisfying a defined criterion. A level of difficulty may be provided together with the modified challenge generated by an adjacent service node, the level of difficulty at least in part defining said defined criteria.

According to a third aspect of the present invention there is provided a service node configured for use within a packet network to control the flow of traffic originating at a plurality of sending nodes and destined for a receiving node, the service node being one of a multiplicity of service nodes that will be configured in a tree or other acyclic structure. The node comprises a first receiving unit for receiving a challenge from said receiving node or a downstream service node, a first processing unit for generating and caching a further challenge, and combining that further challenge with the received challenge to generate a modified challenge, and a sending unit for sending said modified challenge to a sending node or to an upstream service node. For handling requests travelling in the downstream direction, the node comprises a second receiving unit for receiving a request destined for said receiving node originating at a sending node, a second processing unit for validating a solution accompanying said request using the cached further challenge, and a forwarding unit for forwarding the request towards said receiving node only if The service node may comprise a decision unit for discarding and/or invalidating any currently cached modified challenge for the same receiving node.

Embodiments of the invention may be implemented without requiring reprogrammable hardware. Rather, these embodiments can be implemented relatively easily using Application Specific Integrated Circuits (ASICs).

DETAILED DESCRIPTION

As has been described above, Concast provides a many-to-one service with overload protection achieved by merging packets at nodes (i.e. Concast-enabled routers) of the Concast network tree. An alternative many-to-one service is presented here which does not rely upon merging packets (although this is possible) but which rather relies upon the distribution of challenges or "puzzles" to the senders, from the recipient. Puzzles are translated as they pass through service nodes to ensure that they are location-specific by the time they reach the senders.

The distributed puzzles are similar in nature to those described in the article by Tuomas Aura, Pekka Nikander, and Jussipekka Leiwo, "DOS-resistant Authentication with Client Puzzles," in Christianson, Malcolm, Crispo, and Roe (Eds.) Security Protocols, 8th International Workshop, Cambridge, UK, Apr. 3-5, 2000; revised papers, LNCS 2133, pp. 170-177, Springer 2001. The puzzle solutions are only valid for a set time period, e.g., 10 seconds. Each intermediate tree node checks that the puzzle solution is valid, and drops received messages if they don't contain a valid puzzle solution or are outside the validity period. Each tree node caches any puzzle solution that it receives for the validity period of that solution, and drops any received message that has a valid but already cached solution.

In contrast to Concast, packets are sent intact from the multiple senders to the single receiver. However, the rate at which senders can send data through the service network is restricted, thereby preventing exhaustion of the receiver's resources. Furthermore, as will be clear from the following discussion, flow rates can be made locally adaptive, reducing the rate of traffic by a relatively greater amount in those parts of the network where there are a large number of active senders. Whilst the proposed service does not necessarily transfer any actual computational load to the network from the receiver (this is achieved by Concast as a result of the merging of packets), it achieves Denial-of-Service (DoS) protection for the receiver in a computationally more efficient manner, as well as providing DoS protection for the intermediate network nodes.

Figure 1:
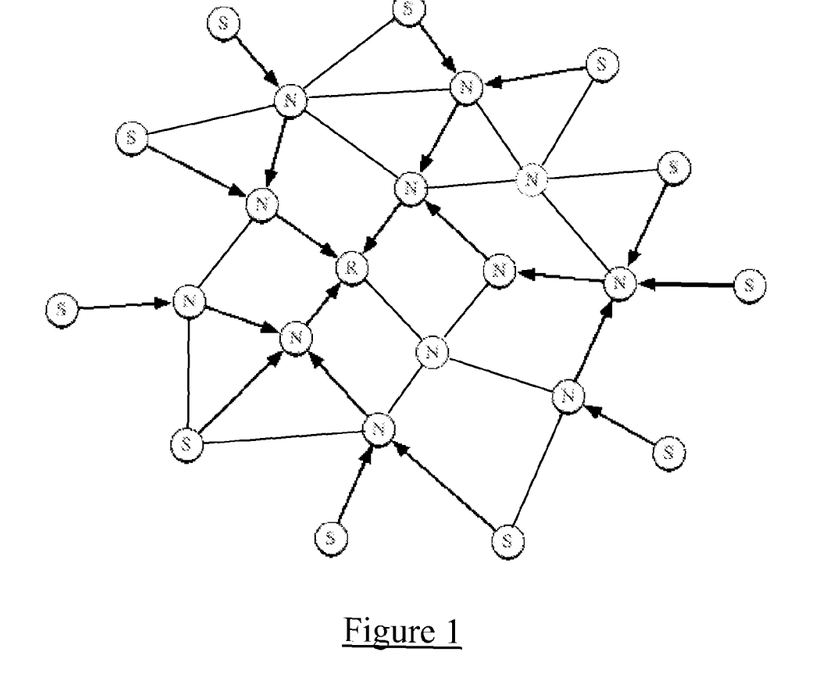
FIG. 1 illustrates schematically a network architecture for a many-to-one packet data transmission service.

FIG. 1 illustrates a service network architecture comprising one receiver R, a set of senders S, and a set of intermediary nodes N. By way of example, the receiver R may be a server, with the Senders S being clients coupled to the receiver via a packet data network comprising packet routers. The intermediary nodes N are typically implemented at ones, but not all, of the packet routers and are responsible for identifying packets associated with the many-to-one service and for handling these appropriately.

Packet routers at which service nodes N are not implemented may be transparent to the nature of the many-to-one packet flows, merely routing packets according to the normal network routing procedure. It will of course be appreciated that distinct trees will typically exist for each receiver/sender(s) set, within the same overlay network.

For any such connected network, it is possible to generate one or more trees rooted at R by making R the root of the tree and then recursively adding intermediary nodes and senders until all senders are added. (Note that there are multiple tree-minimality types to consider here, including shortest-path or delay optimal trees and Steiner or cost optimal trees [Deering, S. E. and Cheriton, D. R. 1990. Multicast routing in datagram inter-networks and extended LANs. ACM Trans. Comput. Syst. 8, 2 (May. 1990), 85-110.]). It may subsequently be possible to prune some of the intermediary nodes, i.e., to remove those nodes that are not required in the paths between the receiver and senders. However, the precise manner in which a tree is constructed is not relevant here, and it is only relevant that there exists a well formed, uniquely identified tree connecting the senders to the receiver through a number of intermediary nodes.

In order to implement the procedures to be described in the network of FIG. 1, all of the nodes in the network must have approximately synchronised clocks. In the absence of any suitable pre-existing mechanism, clock updates may be distributed upstream to all involved nodes.

Consider now a one-way function H which possesses the property that it is, resource-wise, relatively cheap to compute $H(x)$ for any given x, but very expensive to find an x such that $H(x)=y$, for a given y. Many cryptographic hash functions and some other functions, such as memory bound functions [suggested by Abadi, M., Burrows, M., Manasse, M., and Wobber, T. 2003b, "Moderately hard, memory-bound functions", Proceedings of NDSS 2003 (Networks and Distributed Systems Security). 25-39], fulfil these requirements. It is assumed that the domain and range of each H is sufficiently large for the purpose it is used for. In the case of a typical cryptographic hash functions such as SHA-256, around 200 bits or more is sufficient. Of course, whilst for the purpose of this exemplification only a single function H is applied throughout the service network, it will be appreciated that multiple different functions can be used at different entities and indeed within the same entity, as long as there is shared understanding of which function is used where and in which case.

Returning to the network of FIG. 1, in order to implement the many-to-one service with DoS protection, the receiver R distributes a puzzle through the intermediary nodes N. Typically, the receiver R will distribute a new puzzle periodically, for example, every 10 seconds or every 10 minutes. The puzzle generation and distribution process is as follows:

1. The receiver R generates a fresh pseudo-random number $N_R$, stores it locally, and distributes it (in an integrity-protected way) to the next-hop upstream intermediary nodes $I=\{I_1, I_2, \ldots I_k\}$.

2. Upon receiving a value $N_R$, each next hop intermediary node performs the following:
   a. stores the random number $N_R$ received from downstream.
   b. generates and stores a fresh pseudo-random number $N_i$
   c. computes and stores a number $V_i=H(N_R, N_i)$ using the one-way function H
   d. distributes the number $V_i$ to the next-hop upstream intermediary nodes.

3. When the next-hop nodes receive $V_i$, they each perform step 2 above but using the received $V_i$ instead of $N_R$ to compute $V_i(new)$, i.e. $V_i(new)=H(V_i(received),N_i(new))$ 4. Step 3 is repeated at each upstream next hop node until the network nodes at the outer edges of the network have all generated their own $V_i$.

It is appreciated that in a variant of this procedure, instead of generating a single fresh pseudo-random number $N_i$ in step 2b, the node may generate separate random numbers $N_i^1$, $N_i^2, \ldots, N_i^l$, one for each of the l upstream intermediary nodes. Accordingly, it will distribute distinct $V_i^1, V_i^2, \ldots$, to the upstream nodes. The benefit of this variant is that each of the upstream subtrees will have a distinct variant of the puzzle; the drawback is the slightly added resource consumption at each node. Note that it is also possible to combine the basic method and the variant within a single deployed solution, and even within a single node, so that some upstream nodes get a distinct $V_i^l$ while others share a single value $V_i'$.

This mechanism for puzzle distribution creates variants of the original puzzle in such a way that each variant is valid only in the subtree for which the intermediary node generating the variant is the root. By incorporating into each puzzle variant information generated by the receiver R and the intermediary node N generating the variant, both the recipient and the intermediary node can independently verify a claimed solution.

For each variant of the puzzle, the number of possible solutions is made sufficiently large to reduce the risk that valid messages are rejected at a node because of accidental solution collision(s). This is typically ensured by making $V_F$ and P (see below) sufficiently large.

When a sender wants to send a message to the receiver, it requests the current value $V_i$ from any of its immediate intermediary node(s). This value is referred to below as $V_F$ (that is $V_{Final}$). The neighbouring node additionally provides to the sender a difficulty value d. The sender performs the following steps using the received values:

1. Generate a fresh pseudo-random number P.

2. Estimate the time required to solve the puzzle given local resources and the received difficulty value d, and compute a future time t within which the solution is expected to be ready (t is an absolute time according to the node's local clock, which is approximately related to the synchronised node clocks). Note that the value of t must be estimated in a pessimistic way, expecting relatively coarsely synchronised node clock's, e.g., in the order of a several hundred milliseconds to a couple of seconds.

3. Generate a solution value s such that the low order $d+G(t)$ bits of $H(P, V_F, t, s)$ are zero, where the function $G(t)$ adjusts the difficulty d by requiring that there must be more zero bits whenever the range t is longer. For example, $G(t)=0$ for $t<1s$, $G(t)=1$ for $1s<t<2s$, $G(t)=2$ for $2s<t<4s$, etc. As H is expected to be a one-way function, it can be expected that the only computationally feasible way to select a value s so that the formula results in the requisite number of lower order zeroes when the data set is hashed, is by trial and error, i.e. by trying a number of trial values (e.g., in sequence). Consequently, in order to find a suitable value s, on average the sender must make $2^{(d+G(t)-1)}$ attempts. However, depending on H, there may be no upper bound to the number of attempts required. The sender should therefore terminate the computation when it deems that it is no longer realistic to complete the computation within t.

3. Send the solution <P, $V_F$, t, s> to the next-hop intermediary node.

When the first-hop intermediary node receives a solution <P, $V_F$, t, s> from the sender, it performs the following steps in order to determine that the solution is valid:
1. Check that the current time does not exceed t.
2. Check that the value $V_F$ has recently been generated by the node itself and is still considered valid.
3. Check that the solution is not already stored in its cache.
4. Compute h=H(P, $V_F$, t, s).
5. Verify that d+G(t) low order bits of h are zero.
6. If steps 1 to 5 succeed, then the solution is cached until the expiry of time t.

[The value s, or a unique part of it, must be small enough that an intermediary node can effectively cache a large number of such values, whilst at the same time being large enough to avoid unwanted collisions.]

This process allows the intermediary node to gain, among other things, a reasonable assurance that, whoever solved the puzzle, i.e. the sender or some other node providing a service to the sender, probably expended some significant effort in finding the solution. Furthermore, the longer the time range for which the solution is valid, the more resources were probably used.

Once the first hop intermediary node has verified and cached the solution, it proceeds as follows:
7. It tags the solution with the node's stored random number $N_i$ (used previously to compute the node's own $V_i$).
8. It forwards the tagged message <<$N_i$>, <P, $V_F$, t, s>> towards the next node.

When the next node, node j, receives a message from another upstream intermediary node, node i, it repeats the verification steps 1 and 3 to 6 above, with a further step 5' carried out between steps 5 and 6, i.e.:
5'. Check that the value $V_F$ used in the puzzle is H($N_j$, $N_i$), where $N_j$ is the verifying node's own stored random number and $N_i$ is the random number received in the message. Step 5' occurs logically after step 5 as otherwise node j might need to compute H twice instead of just once, in order to determine a solution that does not produce the required number of zeros. The result of the step 5' may be cached and reused whenever another message is received from the same intermediary node i.

In order to allow processing by subsequent intermediary nodes, each intermediary tags the message with its own random number, resulting in the following:

<<$N_k$,$N_{k+1}$, . . . ,$N_{k+n}$><P,$V_F$,t,s>> where $N_k$ is the random number of the intermediary who is the immediate forwarder of the message at this stage, $N_{k+1}$ is the random number of the next intermediary along the tree towards the sender, and $N_{k+n}$ is the random number of the intermediary node that received the message from the sender S. This is analogous to step 7 above. The node then forwards the tagged message to the next hop node, analogous to step 8 above.

To verify the validity of such an extended message, each subsequent intermediary node i has to verify each element of the chain, effectively replacing step 5' above with the following step:
5". For each $N_i$ in the sequence <$N_k$, . . . $N_{K+n}$>, verify that $$VF=H(H( \ldots H(N_{k-1},N_k) \ldots ,N_{k+n-1}),N_{k+n})$$

Of course, an efficient way to verify this is to compute the values recursively in reverse order, namely:

$$\forall i \in k \ldots k+n: V_i=H(V_{i-1},N_i) \text{ where } V_{k-1}=N_{k-1}.$$

It will be appreciated that the validity of a solution can be checked at all intermediary nodes in order to protect against malicious or compromised upstream nodes. Whilst checking at all node is not of course essential, the fact that a check can be made makes an attack, e.g. by an upstream node, less likely. It will also be appreciated that for similar reasons the final node in the network will send the solution to the receiver to allow the receiver, if it desires, to validate the solution (i.e. carrying out steps 1 and 3 to 6 including 5" above).

Note that since many branches of the tree typically share a partial tree, an intermediate node can often avoid computing the Hash values for nodes in the path that are shared with a path associated with a previously cached solution. In this case, the loop of step 5" commences at a first upstream node "unique" to the new path. That is, whenever an intermediate node deep in the network receives a new message from another intermediate node, there is a good chance that the receiving node does not need to perform all the steps in the loop in step 5".

The procedures described above allow the receiver and the network tree nodes to vary the solution lifetime, the size of the total value space, and the density of valid solutions, in order to set a strict upper bound to the amount of traffic that the receiver will receive, independent of the number of the senders. Of course, it is expected that under normal conditions this bound will not be reached. Only in the event of a DoS attack, or some other extraordinary event, will the traffic flow rate be restricted. Even in such an event however, only those senders that are upstream of the particular intermediary node (or nodes) that is (are) limiting the number of packets will be affected. Other senders can continue sending normally and will be unaffected. In the case of location-constrained attackers, once their location is identified, the system can be finetuned without affecting the service at the other parts of the tree by setting a higher degree of difficulty d for those nodes adjacent to the attackers.

The approach described above reveals no information about the internal structure of the network. In some alternative solutions, such as the one explained below, each puzzle includes information about the partial tree that lies between the sender and the receiver. Such information may be valuable to a potential attacker or even to a commercial competitor. For example, through collecting a number of such partial trees from different locations, an attacker could possibly reconstruct the structure of the tree surrounding the receiver, thereby helping the attacker to plan an optimal attack strategy.

With the approach described above, this hiding of networking structure is achieved by requiring the intermediary nodes to compute H recursively in order to verify a claimed solution. Even though the result can be cached and used again during the lifetime of the puzzle (for solutions arriving at the verifying node via the same route), this may be unacceptable in some environments. According to the following alternative approach, senders are allowed to learn information concerning the network structure, but the requirement to recursively compute H is eliminated.

According to this alternative approach, during the puzzle distribution phase, the intermediary nodes continue to generate the random numbers $N_i$. However, instead of applying H to the number received from the previous node and this new $N_i$, the node now simply concatenates the values, yielding a longer $V_i$:

$$V_i = <N_i, N_{i+1}, \ldots, N_k>.$$

In the puzzle solving phase, the whole path $V_i$ is then used as $V_F$, keeping the algorithm the same and binding the solution to the path. Finally, in the verification step, each node verifies that the path $V_F$ is correct up to their own $N_i$.

According to a yet another approach, during the tree formation and puzzle distribution phases, the intermediary nodes can be arranged into a directed acyclic graph (DAG) instead of a tree, and the puzzle can be formed by representing the graph structure. That is, for each intermediary node, there may be more than one node downstream towards the recipient. For example, given the values $V_j$ and $V_k$ that a node i would receive and $N_i$ that it would generate, the resulting Vi would be $<<V_j, V_k>, N_i>$. In other words, when the puzzle is presented to a sender, it will contain the whole subgraph of all potential paths in the DAG leading from the sender to the receiver.

The procedures described here are applicable to the publish/subscribe multicast architecture being developed in the PSIRP EU FP7 STREP project (see also Mikko Särelä, Teemu Rinta-Aho, and Sasu Tarkoma. 2008. RTFM: Publish/Subscribe Internetworking Architecture. Proceedings of ICT Mobile Summit, Stockholm, Jun. 11-13, 2008). The publish/subscribe (or "pubsub") architecture is based upon the principle that users of the network receive data by subscribing to that data, i.e. using a pull rather than the push approach of the traditional Internet. In addition to supporting multicast trees, one could also support many-to-one trees as presented here.

The forwarding tables used by nodes of the many-to-one network will differ however from those used by nodes of the multicast tree (see Section 3.1 of Särelä et al). For the former, instead of simply listing outgoing ports and one or more outgoing labels, one would have a single outgoing port, a single outgoing label, a field for the present values of $N_j$ as received from the previous node, $N_i$ as generated locally, and $V_i$ as forwarded, plus any already received, accepted, and cached solutions and their lifetime. A forwarding table entry for the many-to-one network (for eventual puzzle solutions) may take the form illustrated in Table 1 below. While this requires more space than basic multicast forwarding tables, it is still practical, particularly if the hash function H can be effectively implemented with appropriate and dedicated hardware.

Optimally, assuming a suitable one-cycle-computable one-way function for H, steps 1 to 4 of the solution validity check detailed above can be implemented in parallel using appropriate hardware. Steps 5 and 5' can subsequently be performed in parallel utilising the same hardware during another clock cycle, followed by Step 6. Hence, altogether, processing one packet would take 2 clock cycles (this compares to one cycle for basic multicast forwarding). When using a more conventional implementation of the hash function H, the processing time may need to be multiplied by the number of cycles required to compute one hash value, e.g., by 3 or 16 cycles depending on whether a weaker function is used (such as VMPC One-Way Function by Bartosz Zoltak, running in 3 cycles or less, or a strong standard function is used (such as SHA-1, typically running in 16 clock cycles or less on dedicated hardware), and depending on the number of clock cycles the hardware implementation requires.

Step 7 is trivial and can be implemented in parallel with the previous steps. Step 8 is essentially the same forwarding step a forwarding node would perform even in the case of one-to-many (or one-to-one) traffic, requiring no additional resources. Note, however, that step 5" would either require a relatively large amount of parallelised hardware (in order to be able to perform multiple hashes in parallel) or a number of clock cycles. Hence, in a practical embodiment, step 5' may only be partially implemented or not implemented at all in certain nodes, relying on the incentive created by the potential of being able to perform step 5" in full when needed.

Figure 3:
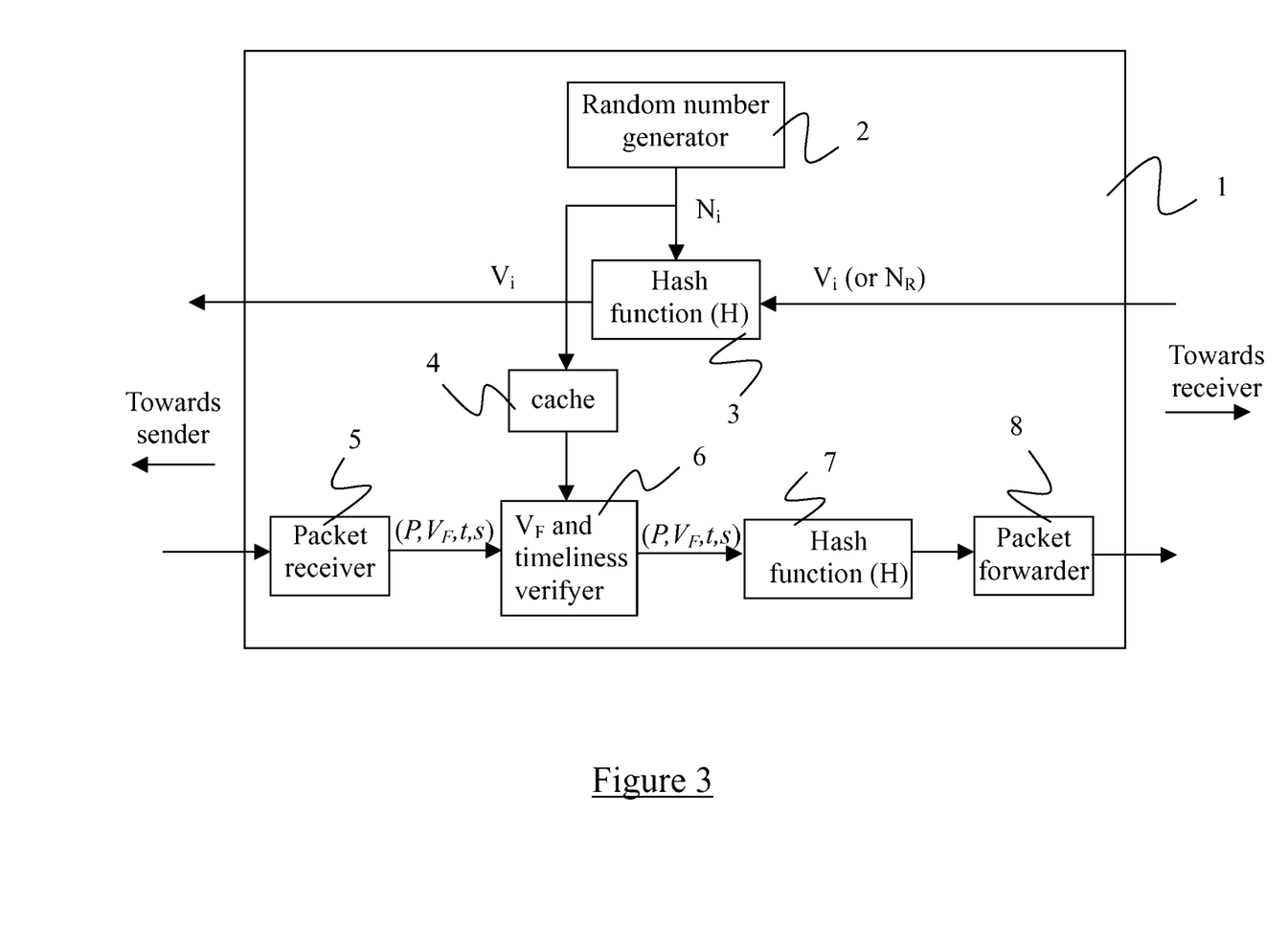
FIG. 3 illustrates schematically an intermediary (forwarding) node of the network of FIG. 1.

FIG. 3 illustrates schematically a possible architecture for an intermediary node 1 of the network of FIG. 1. Of course, only components relating to the many-to-one functionality are shown. Within the node 1, a random number generator 2 generates the local random number $N_i$. A Hash function unit 3 hashes this random number and the $V_i$ received from a downstream node to generate the new $V_i$. This new $V_i$ is forwarded to the next upstream node(s). The local random number is saved in a local cache 4. When a packet (request) is received from an upstream node at a receiver 5, a unit 6 validates the $V_F$ of the solution, and the timeliness. A further Hash function unit 7 validates the solution s. Assuming all checks are successful, a packet forwarder 8 forwards the packet to the next downstream node.

Figure 4:
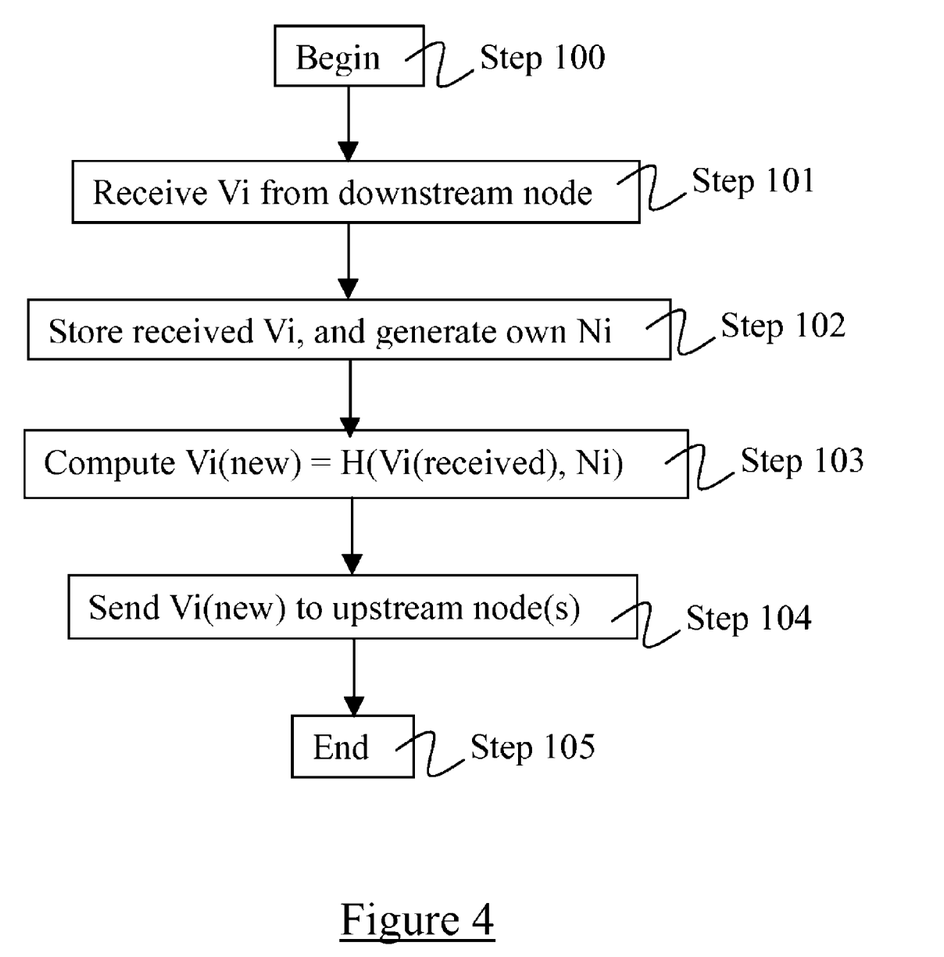
FIG. 4 is a flow diagram illustrating a mechanism for regenerating a puzzle at an intermediary node of the network of FIG. 1 and for distributing that puzzle upstream.

FIG. 4 is a flow diagram illustrating the main steps in the process for distributing a puzzle through a many-to-one overlay network. The steps shown are those carried out at a given one of the intermediary nodes. The process begins at step 100, with a $V_i$ being received at the node from a downstream node. The node caches this $V_i$ (in association with an identity of the Receiver, i.e. the Receiver's address in the overlay network) and generates a local $N_i$ at step 102. At step 103, the node uses $V_i$ and $N_i$ to generate a new $V_i$. At step 104, the new $V_i$ is sent to the next-hop upstream node(s). The process ends at step 105.

Figure 5:
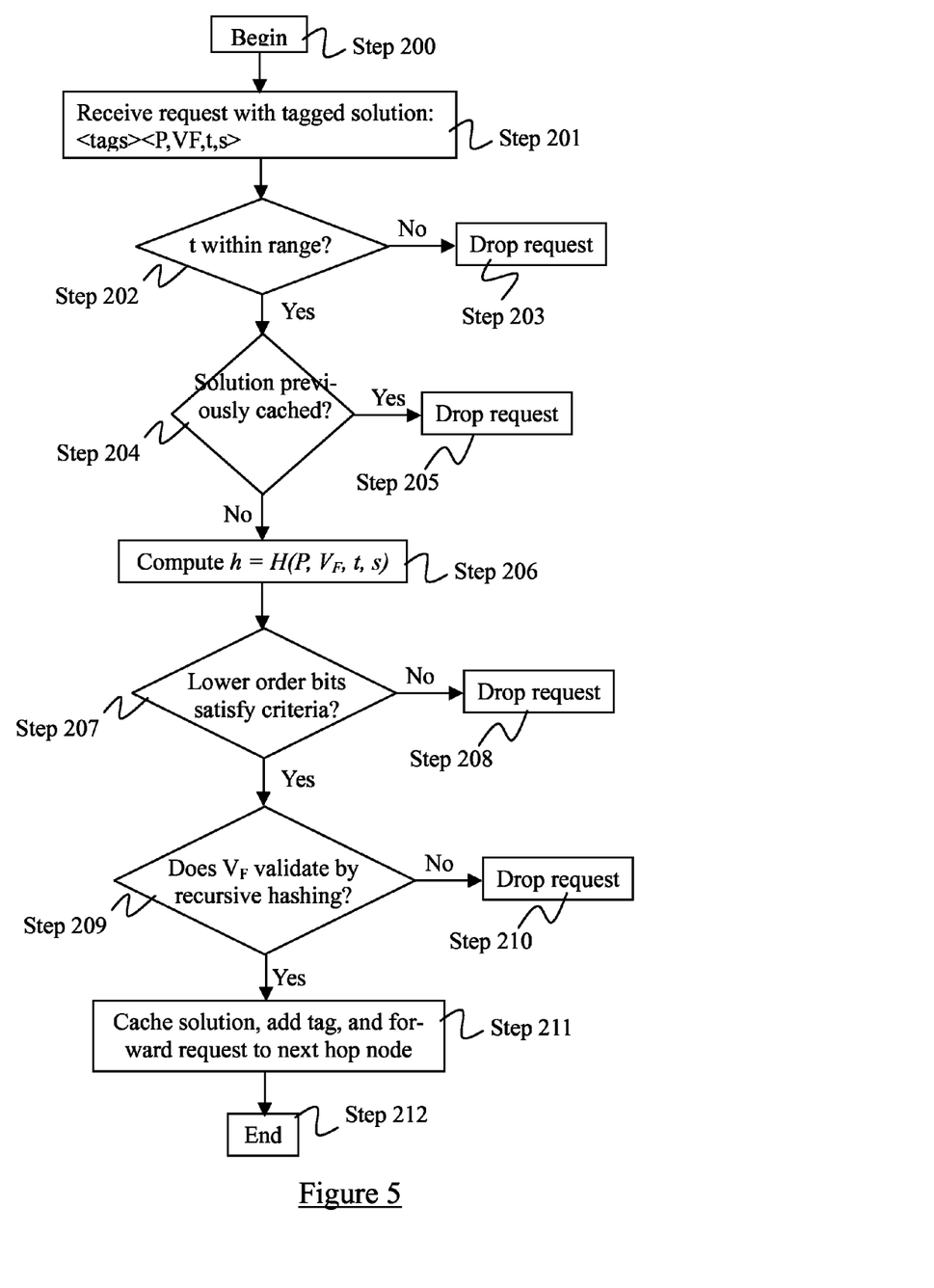
FIG. 5 is a flow diagram illustrating a mechanism for handling requests at an intermediary node.

FIG. 5 illustrates the main steps carried out at an intermediary node of the overlay network and associated with handling a packet (request) sent from a sender towards a receiver. The process begins at step 200, and at step 201 the node receives a request including a solution vector and accompanying tags. The node checks the timeliness of the solution at step 202, using t. If the solution is outside the accepted time range, the packet is dropped at step 203. If the solution is within range, at step 204 the node checks whether or not the solution is cached, i.e. it has already been used. If yes, the packet is dropped at step 205. If the solution has not been used before, the node generates a Hash over the solution vector at step 206. A check is performed on the lower order bits of the hash value at step 207. If the solution is not valid, the packet is dropped at step 208. If the solution is valid, the node checks at step 209 that the VF of the solution vector can be computed using the node's cached random number and those with which the packet is tagged. If not, the packet is dropped at step 210. If yes, then at step 211 the packet is forwarded to the next hop downstream node. The packet handling process ends at step 212.

Figure 6:
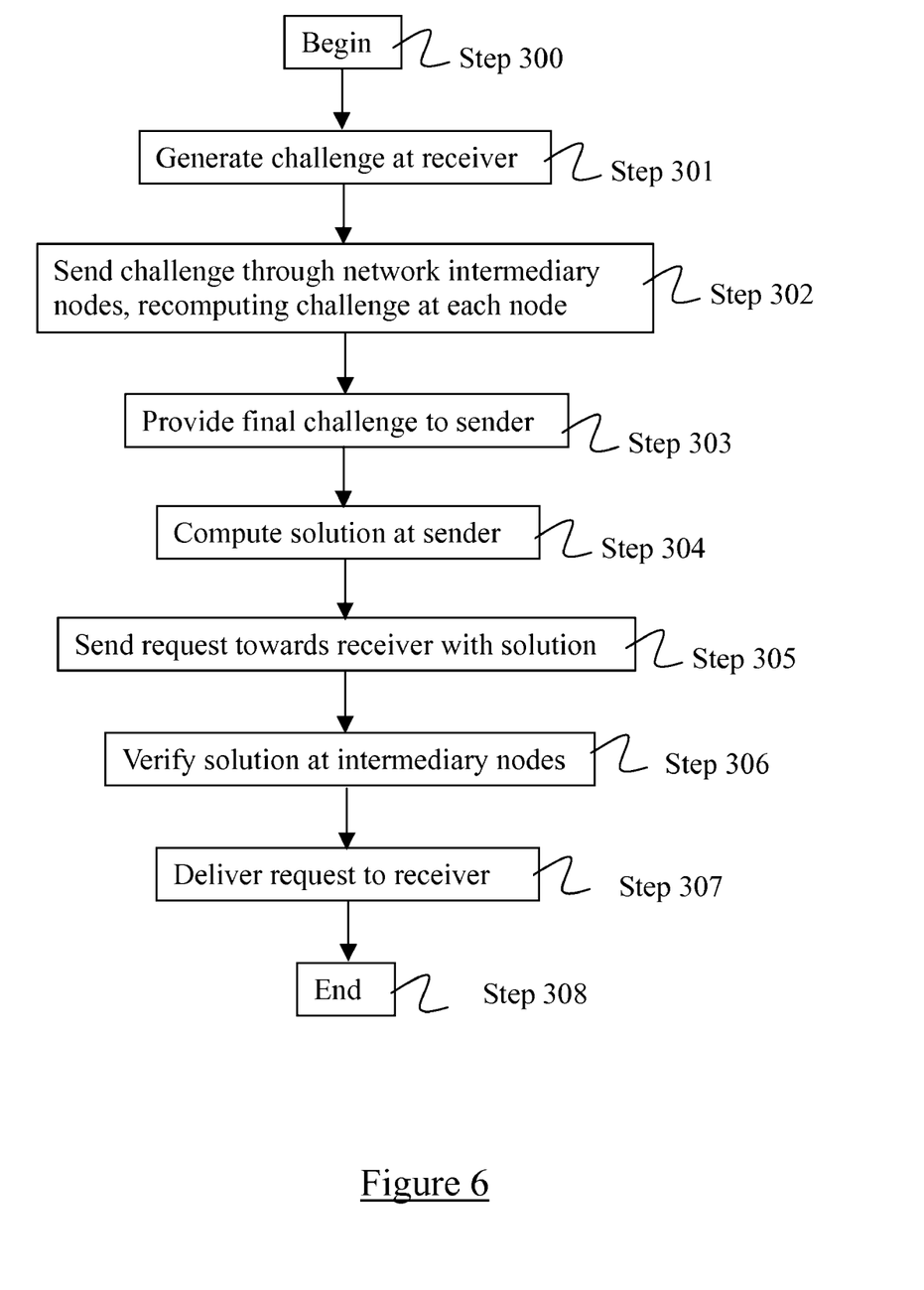
FIG. 6 is a flow diagram illustrating an overall method of puzzle distribution and request handling within the network of FIG. 1.

FIG. 6 is a flow diagram illustrating the main steps in the overall many-to-one control process. The process begins at step 300, with the receiver generating a puzzle or challenge at step 301. This puzzle is distributed through the nodes of the overlay network at step 302, with each intermediate node regenerating the puzzle. At step 303 a puzzle is sent by an edge node to a sender. At step 304 the sender computes a solution and constructs the solution vector, and at step 305 sends a request including the solution towards the receiver. The solution and its timeliness are checked at intermediate nodes, step 306, and at step 307 the request is delivered to the receiver (assuming that the solution has passed the checks at all intermediate nodes). The process ends at step 309.

Considering further application to the pubsub architecture, to be able to distribute a puzzle, the upper planes in the RTFM architecture (rendezvous/topology) must establish local forwarding paths from the receiver to the intermediary nodes immediate to it, and then from each intermediary node to those upstream nodes that follow in the tree. This is depicted with the thin open-ended arrows in FIG. 2. Note, however, that such forwarding paths are likely to exist anyway, as the nodes will need to communicate with the neighbouring nodes for other reasons. If the forwarding paths are physically local, that alone may be assumed to provide sufficient integrity protection for distributing the puzzles through the network. If not, it is assumed that integrity protection will be needed for other messages flowing over the forwarding path, and that the same protection mechanism can be used to protect the puzzle distribution as well.

Once the forwarding paths are established, the puzzle distribution procedure can be implemented with a single-message protocol. Furthermore, by setting the puzzle lifetime and puzzle regeneration frequency appropriately (e.g. lifetime=10 s and frequency=once every second), the protocol becomes robust against occasional message drop without any feedback channel at message level (i.e. to deliver acknowledgments of puzzle receipt from the intermediary nodes to the receiver). A feedback channel will still be needed to ensure the message flow between the nodes in the first place, but such a channel is likely to be needed anyway for node-to-node communications.

Note that, in this implementation, the intermediary node generates a separate random number N for each next node, and remembers paths based on the incoming forwarding label. (See Section 3.1 of Särelä et al 2008 for an explanation of how forwarding labels are used in the said pubsub architecture.) This allows the node to independently verify solutions sent by each of the next nodes. Also note that, since the number of cached solutions per incoming link is likely to vary significantly, it is not efficient to cache them into the forwarding table. It is preferred to use a separate memory for that. Since each solution will be different anyway, the memory can be shared by all links, if so desired.

Figure 2:
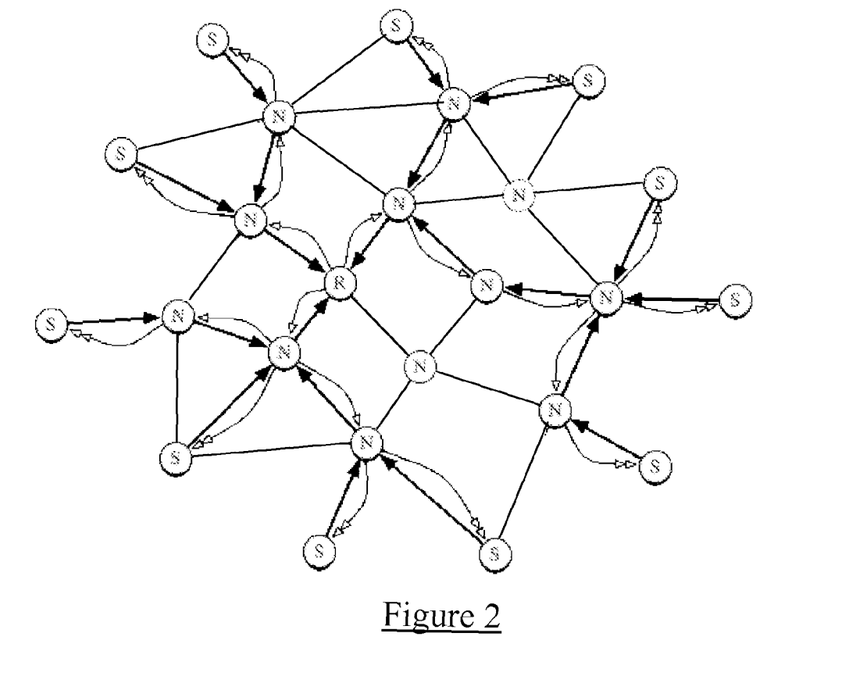
FIG. 2 illustrates forwarding paths within the network of FIG. 1, between a plurality of senders and a single receiver.

For neighbour discovery and network attachment purposes, those tree nodes that serve directly the senders will need to publish network attachment messages on the local link. In FIG. 2, these are indicated by the arrows with a double open end; note that while only those that are relevant to the present discussion are shown, each intermediate node is likely to send such messages to every end host that connects to it. Given that such network attachment messages will exist, it is easy to piggyback puzzle distribution on those messages. In particular, each network attachment announcement sent by a local access router or equivalent infrastructure node will carry the current puzzle and a name for the local reply channel, i.e., a local forwarding path identifier that the sender can use to send the packet towards the receiver, along with the puzzle solution. Furthermore, the network attachment announcement can include the current time as perceived by the intermediary node, thereby implementing the required time synchronisation. The puzzle-related content of the network attachment message can therefore be described as follows:

The actual local puzzle parameters $<V_F, d>$, encoded suitably.

A forwarding path identifier to used in the reply message.

The current time.

Considering the present Internet architecture, the many-to-one network could be implemented using the existing "anycast" service and a new set of intermediary nodes. Anycast is a service in which packets are routed to the nearest or best destination as viewed by the routing topology. Packets sent to the appropriate anycast address towards the centralised server would pass through the intermediary nodes implementing the service as outlined above. For forwarding, the intermediary nodes would either send valid packets using the same anycast address but a different network interface, causing the anycast routing to forward the packet to the next intermediate node (or the recipient), or forward the packet out through the same network interface but using a different address, e.g., the next intermediate node's unicast address.

A new IPv6 extension header can be defined, e.g. between the IPv6 or IPv4 header and the real upper layer payload in the packet, to identify a packet as being associated with the new many-to-one service. Hence, the service would be available for all services in the Internet, including UDP-based services such as the DNS. Any traffic arriving at an intermediary node without the proper extension header would trigger the intermediary node to reply with a unicast packet containing the requisite puzzle.

It will be appreciated that the present invention can be implemented by using a group of nodes to implement the recipient R, without requiring any internal communication within the group other than pre-agreement on the algorithm to generate the puzzles. Accordingly, all the nodes within the group R will generate new, identical versions of the puzzle at approximately the same time. Consequently, the intermediary nodes will have the freedom to send valid solutions towards any node in the group R, thereby increasing the robustness of the solution. Note that this implementation is especially suited to the present Internet, where the intermediary nodes close to some recipient node R can easily send the packet instead to another recipient node within the group R, for example, in the case that the closest R is overloaded or fails.

It will be appreciated by the person of skill in the art that various modifications may be made to the above described embodiments without departing from the scope of the present invention.

TABLE 1

| Incoming label | Outgoing port | Outgoing label | $N_i, V_i$ | Remembered received $N_i$ |
|---|---|---|---|---|
| 123 | 5 | 321 | $N_1, V_1$ | |
| 456 | 5 | 321 | $N_2, V_2$ | |
| 789 | 5 | 321 | $N_3, V_3$ | |

The invention claimed is:

1. A method of controlling traffic flow through a service node located within a packet network, said traffic flow originating at a plurality of sending nodes, continuing downstream through a multiplicity of service nodes configured in a tree or other acyclic structure, and being destined for a receiving node, said service node comprising one of said multiplicity of service nodes, the method comprising:

receiving at the service node a challenge from said receiving node or a downstream service node;

at the service node, generating and caching a further challenge, and combining that further challenge with the received challenge to generate a modified challenge;

at the service node, sending said modified challenge to a sending node or to an upstream service node;

at the service node, receiving a request that originated at a sending node and that is destined for said receiving node;

at the service node, validating a solution accompanying said request using the cached further challenge by verifying at the service node that the solution accompanying the request is valid based on one or more criteria; and at the service node, forwarding the request towards said receiving node only if the solution is valid, otherwise dropping the request.

2. A method according to claim 1, wherein each said challenge comprises an operand and wherein combining the further challenge with the received challenge comprises applying a pre-defined function to the challenges.

3. A method according to claim 2, wherein said further challenge is a randomly generated number.

4. A method according to claim 2, wherein said pre-defined function is a one-way function.

5. A method according to claim 4, wherein said pre-defined function is a hash function.

6. A method according to claim 1, further comprising, upon receipt of said challenge, discarding, invalidating, or both invalidating and discarding any modified challenge that was previously generated for said receiving node and that is currently cached.

7. A method according to claim 1, wherein validating the solution comprises verifying that an operand accompanying said request is derivable from the cached further challenge.

8. A method according to claim 7, wherein said verifying comprises iteratively applying a hash function H to the cached further challenge $N_{k-1}$, according to:

$$H(H(\ldots H(N_{k-1}, N_k) \ldots, N_{k+n-1}), N_{k+n})$$

where the challenges $N_k \geq 1$ are included with said request.

9. A method according to claim 8, wherein the iterative application is terminated, and said operand verified, if a challenge N in the challenge sequence is reached that has previously been cached.

10. A method according to claim 9, further comprising including said cached further challenge with said request if the request is to be forwarded.

11. A method according to claim 1, wherein validating the solution comprises applying a hash function to a set of data components that is included with said request and that includes a time value, and verifying that the result satisfies a criterion dependent upon said time value, and wherein the method further comprises discarding said request if the time value has expired.

12. A method according to claim 1, wherein said receiving comprises receiving a plurality of challenges from respective downstream service nodes, said modified challenge being generated by combining said further challenge with the received challenges.

13. A method of controlling the volume of traffic within a packet network and being sent from a plurality of sending nodes to a receiving node, the packet network comprising a multiplicity of service nodes configured in a tree or other acyclic structure between the sending nodes and the receiving node, the method comprising:

generating a challenge at said receiving node;

sending said challenge from said receiving node to each adjacent service node that is adjacent said receiving node in said structure;

at each said adjacent service node, generating a further challenge, combining that further challenge with the received challenge to generate a modified challenge, and sending the modified challenge to each next adjacent service node towards said sending nodes;

at each service node in said structure that receives a challenge from another service node, repeating said generation of a further challenge, said combining of that further challenge with the received challenge to generate a modified challenge, and said sending of the modified challenge to each next adjacent service node towards said sending node, until all service nodes in said structure have generated a modified challenge;

for each sending node wishing to send packets to said receiving node, providing that sending node with the modified challenge generated by an adjacent service node that is adjacent to that sending node in said structure;

using the received modified challenge at said sending node to generate a solution;

sending a request including said solution, from said sending node towards said receiving node through said structure; and validating said solution at one or more service nodes that receive said request by verifying at the service node that the solution accompanying the request is valid based on one or more criteria, and forwarding the request through said structure only if the solution is valid, otherwise dropping the request.

14. A method according to claim 13, wherein said challenge generated at said receiving node and each of said further challenges is a random number, and wherein generating a modified challenge comprises applying a one-way function to said received challenge and said further challenge.

15. A method according to claim 13, wherein using the received modified challenge at said sending node to generate a solution comprising identifying a solution value that, when hashed with the received modified challenge and, zero or more further components, produces a result satisfying a defined criterion.

16. A method according to claim 15, further comprising providing said sending node with a level of difficulty together with the modified challenge generated by an adjacent service node, the level of difficulty at least in part defining said defined criteria.

17. A service node configured for use within a packet network to control the flow of traffic originating at a plurality of sending nodes, continuing downstream through a multiplicity of service nodes configured in a tree or other acyclic structure, and being destined for a receiving node, said service node comprising one of said multiplicity of service nodes, said service node comprising:

a first receiving unit for receiving a challenge from said receiving node or a downstream service node;

a first processing unit for generating and caching a further challenge, and for combining that further challenge with the received challenge to generate a modified challenge;

a sending unit for sending said modified challenge to a sending node or to an upstream service node;

a second receiving unit for receiving a request that originated at a sending node and that is destined for said receiving node;

a second processing unit for validating a solution accompanying said request using the cached further challenge by verifying at the service node that the solution accompanying the request is valid based on one or more criteria; and a forwarding unit for forwarding the request towards said receiving node only if the solution is valid, otherwise dropping the request.

18. A service node according to claim 17, wherein each said challenge comprises an operand and wherein the first processing unit is configured to apply a predefined function to the challenges.

19. A service node according to claim 17, further comprising a decision unit for, upon receipt of said challenge, discarding, invalidating, or both invalidating and discarding any modified challenge that was previously generated for said receiving node and that is currently cached.

20. A service node according to claim 18, wherein the first receiving unit is configured to receive a plurality of challenges from respective downstream service nodes, and wherein said first processing unit is configured to generate said modified challenge by combining said further challenge with the received challenges.

* * * * *

UNITED STATES PATENT AND TRADEMARK OFFICE
CERTIFICATE OF CORRECTION

PATENT NO. : 8,547,848 B2  
APPLICATION NO. : 13/003040  
DATED : October 1, 2013  
INVENTOR(S) : Nikander et al.

Page 1 of 1

It is certified that error appears in the above-identified patent and that said Letters Patent is hereby corrected as shown below:

On the Title Page, in Item (75), under "Inventors", in Column 1, Line 2, delete "Sarela," and insert -- Särelä, --, therefor.

On the Title Page, in Item (74), under "Attorney, Agent, or Firm", in Column 2, Line 1, delete "Bennett." and insert -- Bennett, --, therefor.

In the Drawings

In Fig. 3, Sheet 2 of 5, for Tag "6", in Line 3, delete "verifyer" and insert -- verifier --, therefor.

In the Specification

In Column 4, Lines 9-11, delete "The service............node." and insert the same at Line 8, after "if", as a continuation paragraph.

In Column 6, Line 11, delete "$N_i$" and insert -- $N_i$. --, therefor.

In Column 6, Line 13, delete "H" and insert -- H. --, therefor.

In Column 6, Line 18, delete "$N_i$(new))" and insert -- $N_i$(new)). --, therefor.

In Column 10, Lines 16-17, delete "Hash function unit 3" and insert -- Hash function unit 7 --, therefor.

Signed and Sealed this  
Eighteenth Day of February, 2014

Michelle K. Lee  
*Deputy Director of the United States Patent and Trademark Office*